Jan. 29, 1963 F. BERRY 3,075,506
SPHERICAL TRAJECTORY ROTARY POWER DEVICE
Filed July 31, 1961 8 Sheets-Sheet 1

INVENTOR.
FRANK BERRY
BY
Robertson & Smythe
ATTORNEYS.

Jan. 29, 1963 F. BERRY 3,075,506
SPHERICAL TRAJECTORY ROTARY POWER DEVICE
Filed July 31, 1961 8 Sheets-Sheet 4

INVENTOR.
FRANK BERRY
BY
Robertson & Smythe
ATTORNEYS.

Jan. 29, 1963  F. BERRY  3,075,506
SPHERICAL TRAJECTORY ROTARY POWER DEVICE
Filed July 31, 1961  8 Sheets-Sheet 5

0°-360°

90°

180°

270°

INVENTOR.
FRANK BERRY
BY
Robertson & Smythe
ATTORNEYS.

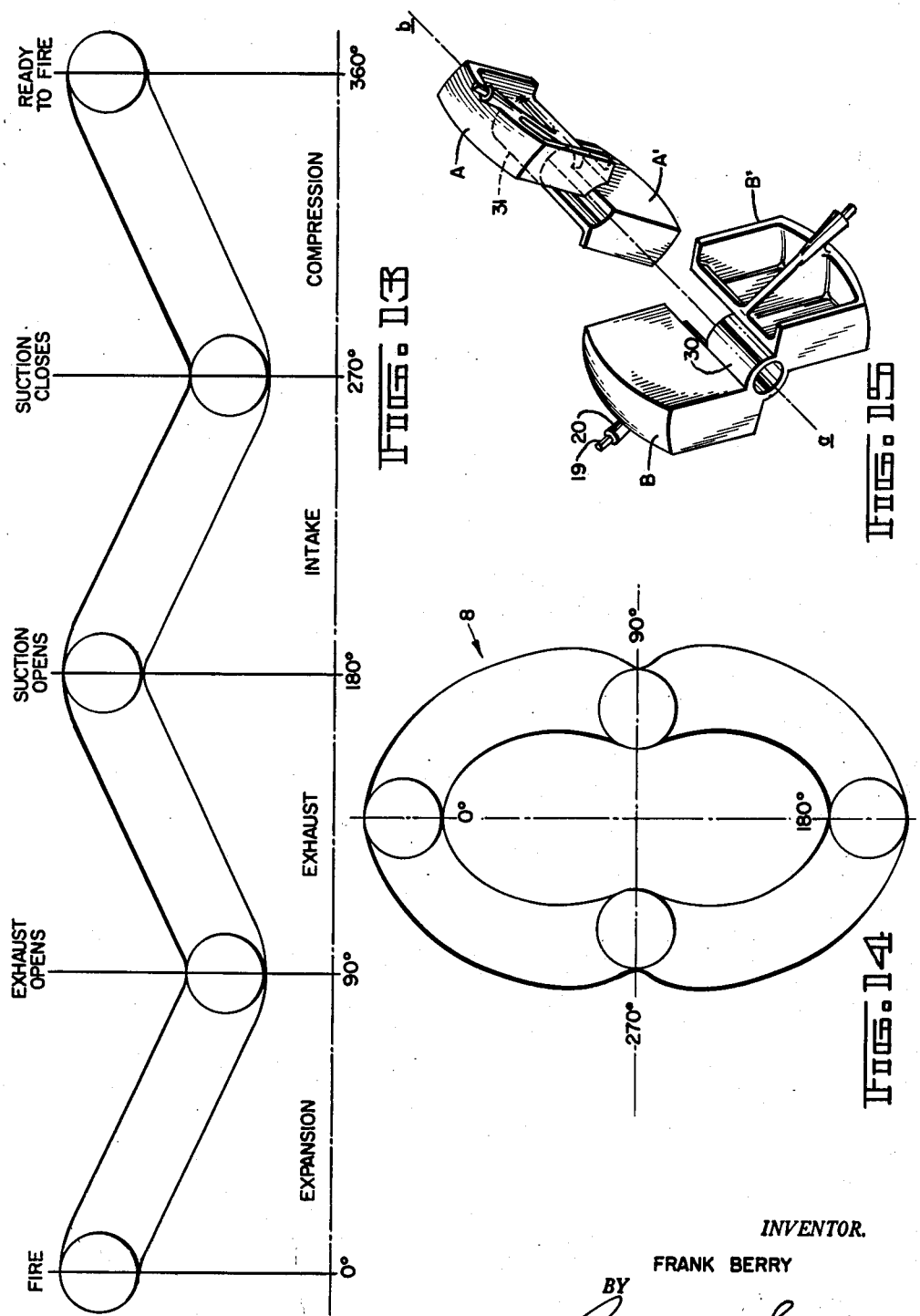

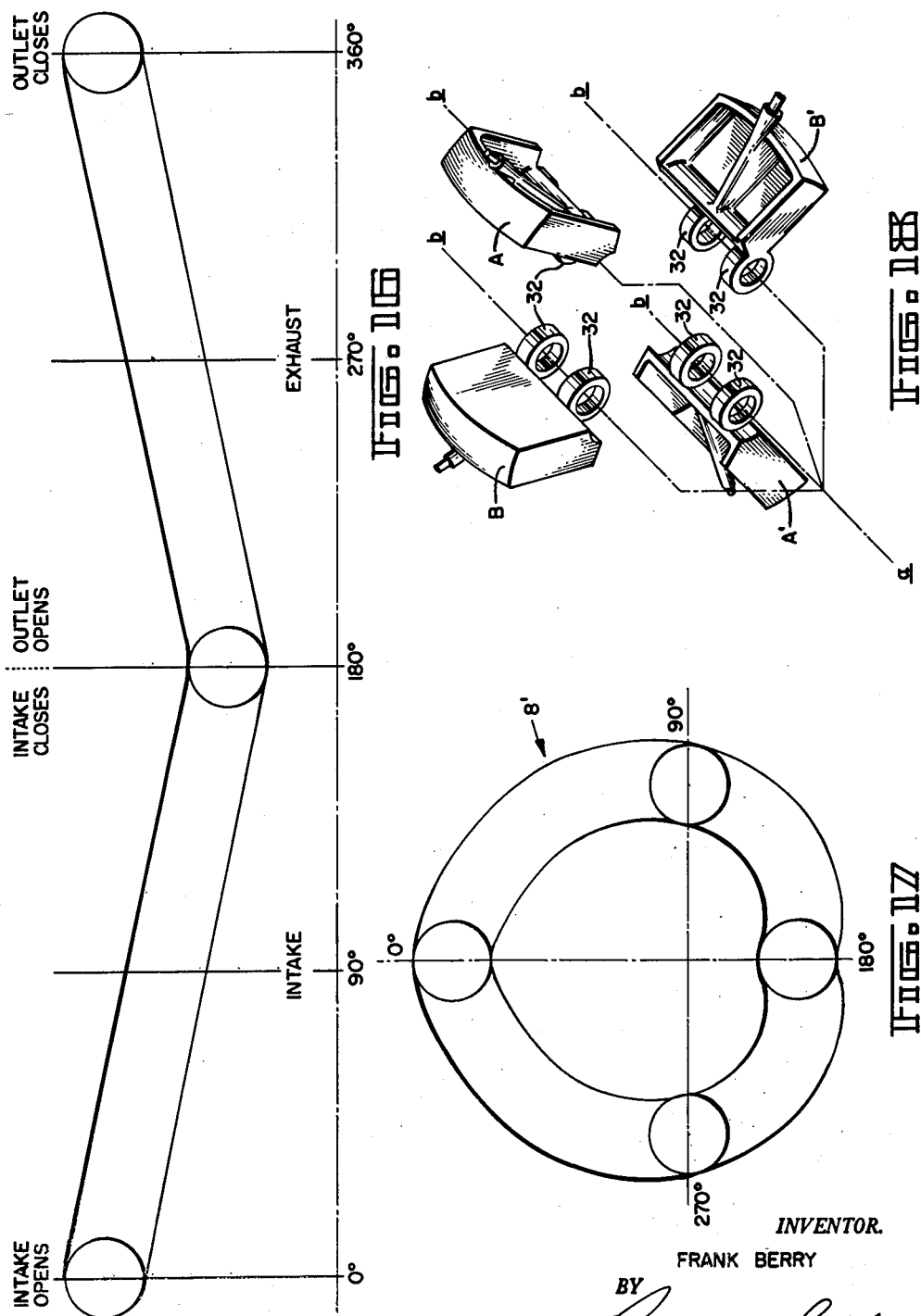

Jan. 29, 1963 F. BERRY 3,075,506
SPHERICAL TRAJECTORY ROTARY POWER DEVICE
Filed July 31, 1961 8 Sheets-Sheet 8

▓▓▓ – COMPRESSED MIXTURE
▒▒▒ – BURNING

INVENTOR.
FRANK BERRY
BY
*Robertson F. Smythe*
ATTORNEYS.

United States Patent Office 3,075,506
Patented Jan. 29, 1963

3,075,506
SPHERICAL TRAJECTORY ROTARY
POWER DEVICE
Frank Berry, Corinth, Miss., assignor to Differential Hydraulics, Inc., Memphis, Tenn., a corporation of Tennessee
Filed July 31, 1961, Ser. No. 127,931
6 Claims. (Cl. 123—43)

The invention relates to rotary power devices, inclusive of internal combustion engines, compressors, air motors, and hydraulic pumps and motors.

Conventional types of internal combustion engines and of other forms of rotary power devices have in general employed pistons moving linearly in straight or circular paths such that the locus of a point on the piston will either be a straight line or a line defining a flat surface. Such piston movements may therefore be considered as being confined to either a straight line or a single plane, and thus are to be regarded as operating in a two dimensional system. According to my invention, a rotary power device is so constructed that its pistons are movable in a compound trajectory such that the locus of a point on a piston defines a sphere, thus introducing a three dimensional piston movement. This is accomplished by using a casing having a spherical interior within which rotates a piston cage within which, in turn, one or more pistons oscillate about an axis normal to the rotation axis of the cage. By opening up the design of rotary power devices from a two dimensional to a three dimensional system, several limitations inherent in the older system are avoided and, rather surprisingly, the introduction of the third dimension results in a simplification where one might expect instead to find increased complexity of parts and construction.

Speaking now with more particular reference to rotary internal combustion engines, increasing attention has been given for some years past to the possibility of using eccentric or epitrochoidal piston rotors internally geared to the drive shaft and operating within a generally elliptical casing. The movement of the pistons in this type of engine is confined to a single plane; hence such devices fall within the classification of the two dimensional systems characteristic of the art prior to my invention. Such rotary engines possess three inherent faults: (1) the difficulty of achieving a practical seal between the tips of the pistons and the walls of the chamber within which they can have only a line contact at variable angle of incidence, (2) the problem of vibration and wear due to imbalance of the movable parts, and (3) the practical inability to design for desired compression ratios. By contrast, my spherical trajectory three dimensional system makes it possible (a) to provide spherical sealing areas of substantial extent between the pistons and the spherical interior of the casing, (b) to obtain inherent balance of all rotating parts, and (c) to obtain favorable compression ratios due to the possibility of achieving a very high displacement per revolution. Besides, the spherical trajectory engine affords a particularly high displacement per unit size and weight of the engine so as to yield a high horsepower rating per pound and per unit of size. Another favorable result of my spherical trajectory engine is that it solves the problem of how to get direct transmission of power to a drive shaft through a cam without the use of any gears, and in a construction of extreme simplicity.

With reference to the accompanying drawings, I shall now describe the best mode contemplated by me of carrying out my invention:

FIGS. 5–12 inclusive are diagrammatic positional views of the moving parts of the engine of FIGS. 1 to 4 inclusive.

Figure 1:
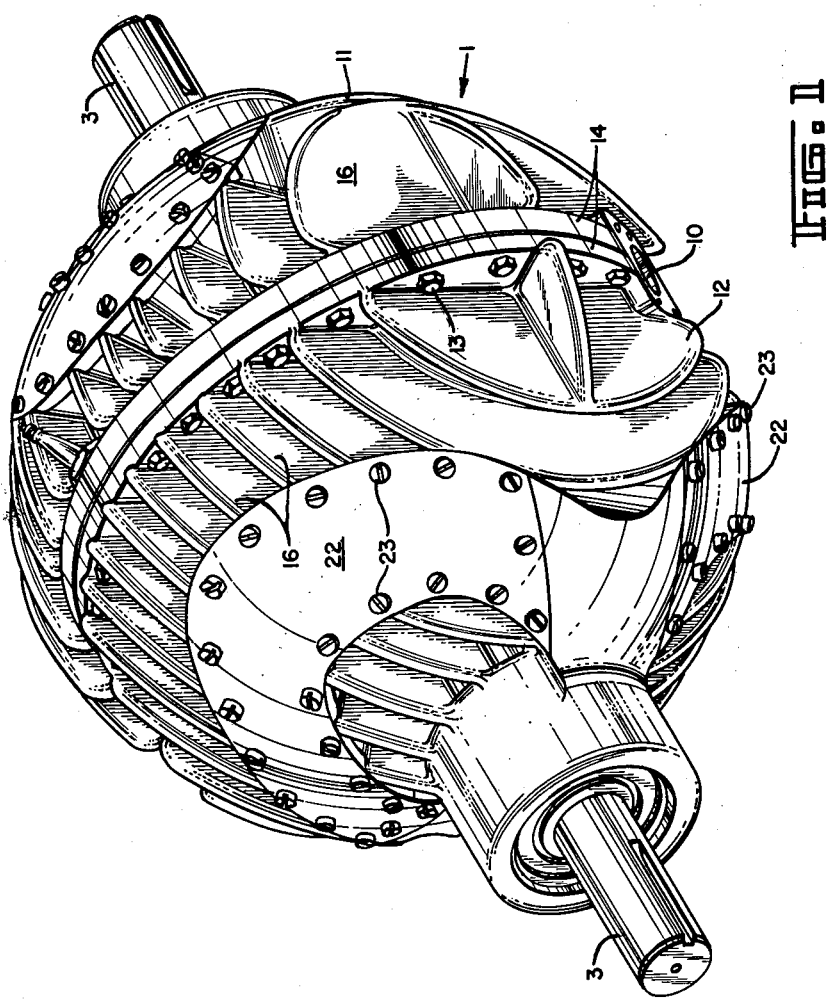
FIG. 1 is a perspective view of an internal combustion engine constructed in accordance with the invention.
Figure 2:
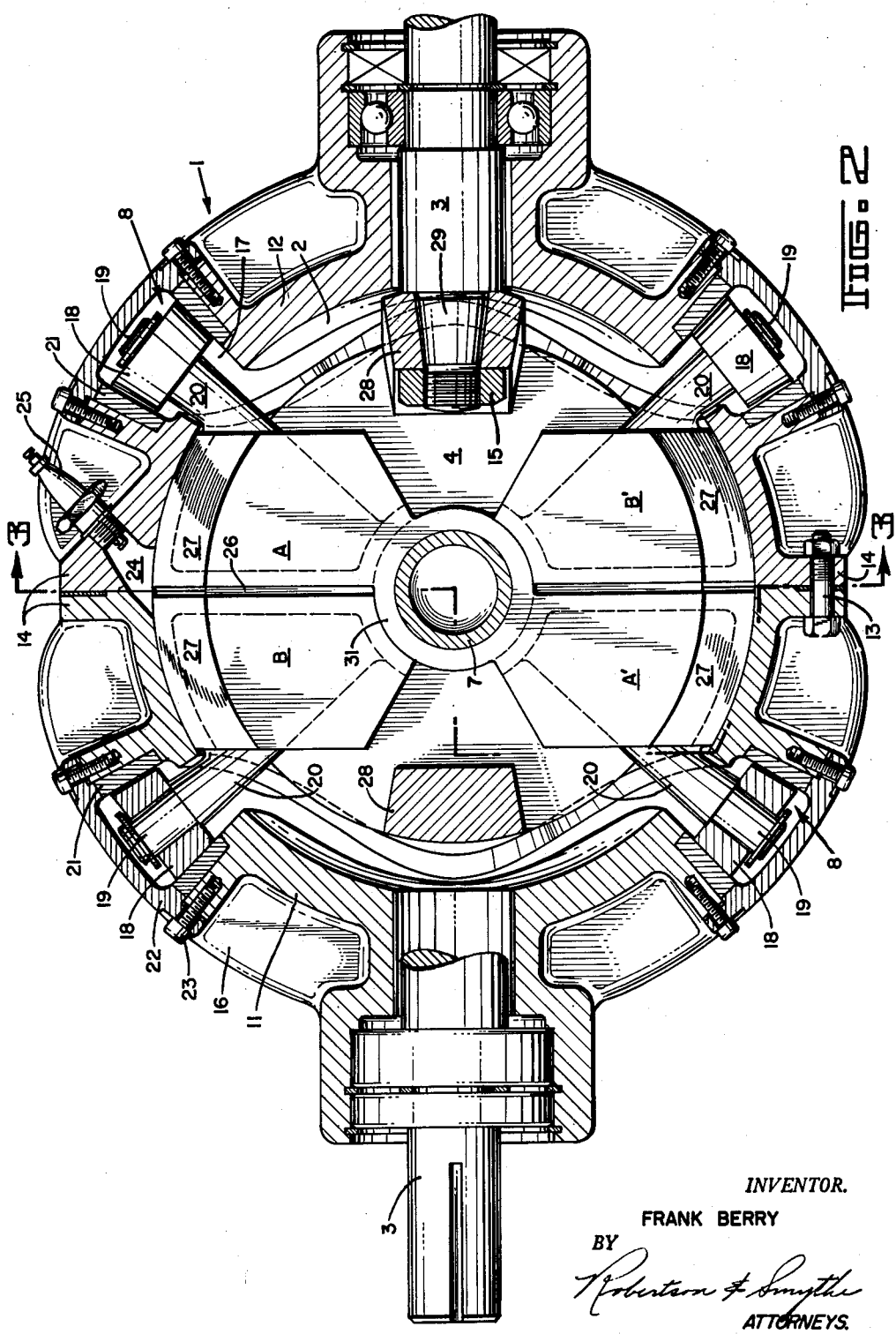
FIG. 2 is a longitudinal cross sectional view of the engine of FIG. 1 taken in the plane of the axis of the drive shaft and normal to the scissoring axis of the piston elements.
Figure 5:
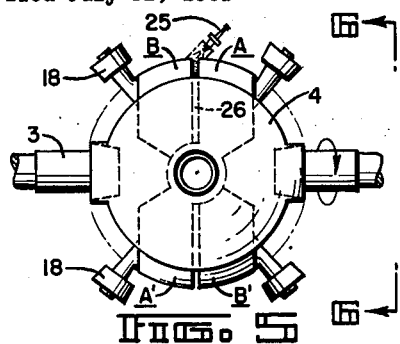

FIG. 5 shows the parts in the same relation as FIG. 2 and represents the instant of firing for one pair of pistons.

Figure 6:
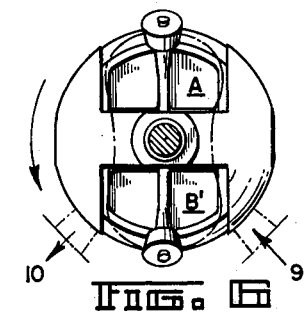

FIG. 6 is a view taken at right angles to FIG. 5.

Figure 7:
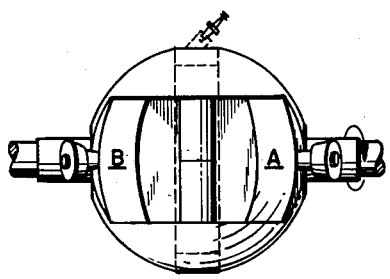

FIG. 7 is a view showing the position of the parts following 90° rotation from the FIG. 5 position and represents the conclusion of expansion and the beginning of exhaust (for the aforesaid "one pair" of pistons).

Figure 8:
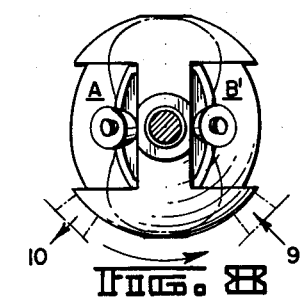

FIG. 8 is a view taken at right angles to FIG. 7. The direction of the 90° rotation as described with reference to FIGS. 6 and 8 will be seen to be counterclockwise. (Viewed from the other end of the engine, the rotation would be clockwise, as in FIG. 3.)

Figure 9:
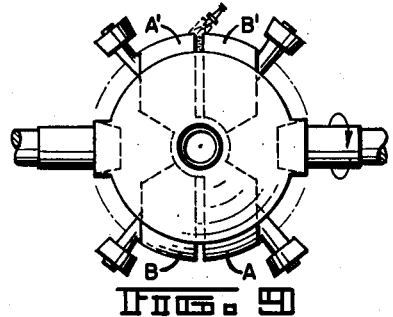

FIG. 9 is a view showing the position of the parts after 180° rotation from the position shown in FIG. 5, representing the conclusion of the exhaust and the beginning of intake.

Figure 10:
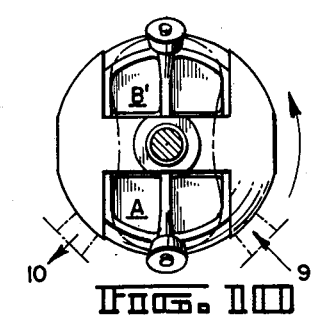

FIG. 10 is a view taken at right angles to FIG. 9.

Figure 11:
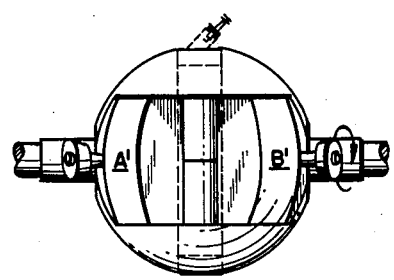

FIG. 11 is a view showing the position of the parts following 270° of rotation from the position shown in FIG. 5, representing the conclusion of intake and the beginning of compression.

Figure 12:
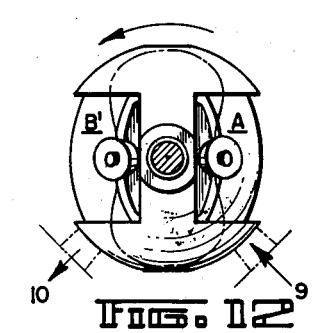

FIG. 12 is a view taken at right angles to FIG. 11.

FIG. 13 is a development of one of the cam tracks.

FIG. 14 is a diagrammatic view of the cam track shown in the developmental view, FIG. 13.

FIG. 15 is an exploded perspective view of the piston elements.

FIG. 16 is a development of the cam track for a pump, motor or compressor.

FIG. 17 is a diagrammatic view of the cam track shown in the development view, FIG. 16.

FIG. 18 is an exploded perspective view of the piston elements of the pump, motor or compressor.

FIGS. 19 to 24 inclusive are detail operational views to illustrate the firing action in pistons having faces of various forms.

Figure 19:
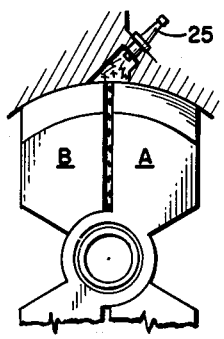

FIG. 19 shows flat faced pistons at the instant of firing.

Figure 20:
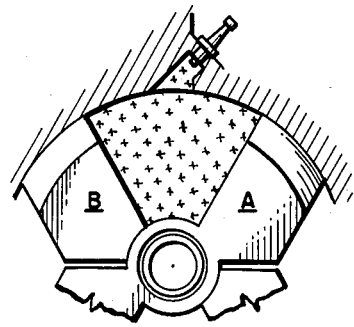

FIG. 20 shows the pistons of FIG. 19 in the positions occupied at the end of expansion.

Figure 21:
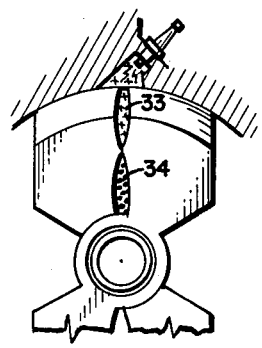

FIG. 21 shows piston faces comprising pockets, the pistons being in the positions occupied at the instant of firing.

Figure 22:
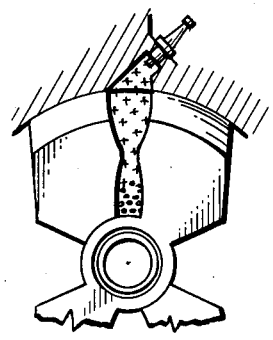

FIG. 22 shows the pistons of FIG. 21 shortly after firing.

Figure 23:
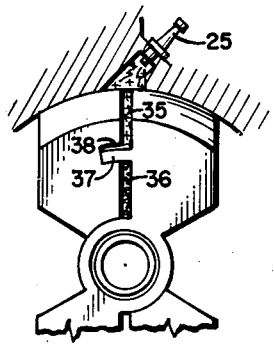

FIG. 23 shows a further modified construction of the pistons as designed to provide firing chambers which initially are separated from one another.

Figure 24:
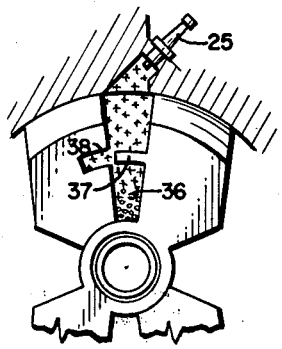

FIG. 24 shows the pistons of FIG. 23 shortly after initial firing.

Internal Combustion Engine

With reference more particularly to FIGS. 1 to 4 inclusive illustrating a preferred form of my internal combustion engine, the invention will be described first in terms of the general construction and arrangement of the parts as they may be used in either the engine or in a compressor, air motor, hydraulic motor or pump. In this context, my invention consists in the provision of a rotary power device comprising a casing 1 with a spherical interior 2, a drive shaft or drive shafts 3 extending through the wall of the casing, a piston cage within the casing and fixed to the drive shaft or shafts 3 as by means of nuts 15, the piston cage having spherical outer portions 6 rotatable in proximity to the spherical interior of the casing and being recessed at 5 to receive piston means, the piston means including two pairs of piston members A, B and A', B', pivotally mounted in the cage, as by means of the hollow shaft 7 for oscillation about an axis a—b (see FIG. 15) substantially normal to a plane containing the axis of rotation of the cage, i.e. the axis of the shafts 3. The spherical interior 2 of the casing combines with portions of the cage, namely recesses 5, and portions of each pair of pistons, to form a power chamber. The cam means indicated generally at 8 predetermine successive positions of the pistons relative to the casing during a cycle of rotation of the cage in which the pistons of each pair oscillate toward and away from one another, to alternately enlarge and contract the volume of the power chamber. A fluid inlet 9 and outlet 10 are constructed and arranged to admit fluid as the respective power chambers enlarge, and to discharge fluid as the respective power chambers contract. It will be understood that in the foregoing generalized description of the invention as applicable to rotary power devices of various kinds, "power chamber" refers to either a chamber in which combustible gases can be ignited to drive the pistons apart as in the internal combustion engine, or a chamber in which air or gases can be compressed when the pistons are driven together upon the application of external mechanical power to the drive shaft 3 as in a compressor, or to a chamber in which compressed air or gases can be expanded to drive the pistons apart as in the case of an air motor or high pressure fluid admitted to drive the pistons apart as in a hydraulic or air motor, or a chamber in which liquid can be discharged under increased pressure when the pistons are brought together upon the application of external power to the drive shaft as in a hydraulic pump; similarly that the term "fluid" includes both compressible and non-compressible fluids as well as explosive fluid mixtures and exhaust gases, the inter-action of the pistons, piston cage, casing, and cam means being essentially the same irrespective of the type of rotary power device in which these elements are employed and irrespective of whether the device is used in the translation of mechanical power into compression or fluid pressures, or in the translation of compression or fluid pressures or the power of internal combustion into mechanical power.

Casing 1 conveniently is made in two substantially hemispherical sections 11 and 12 bolted together as by means of a series of bolts 13 extending through the mating flanges 14 of the two sections, and with suitable gasketing between the sections. Sections 11 and 12 preferably are provided with suitable cooling fins 16 and may be water jacketed if desired (water jacketing not shown). Conventional bearings and seals for the drive shafts 3 may be employed as indicated in FIG. 2.

Figure 4:
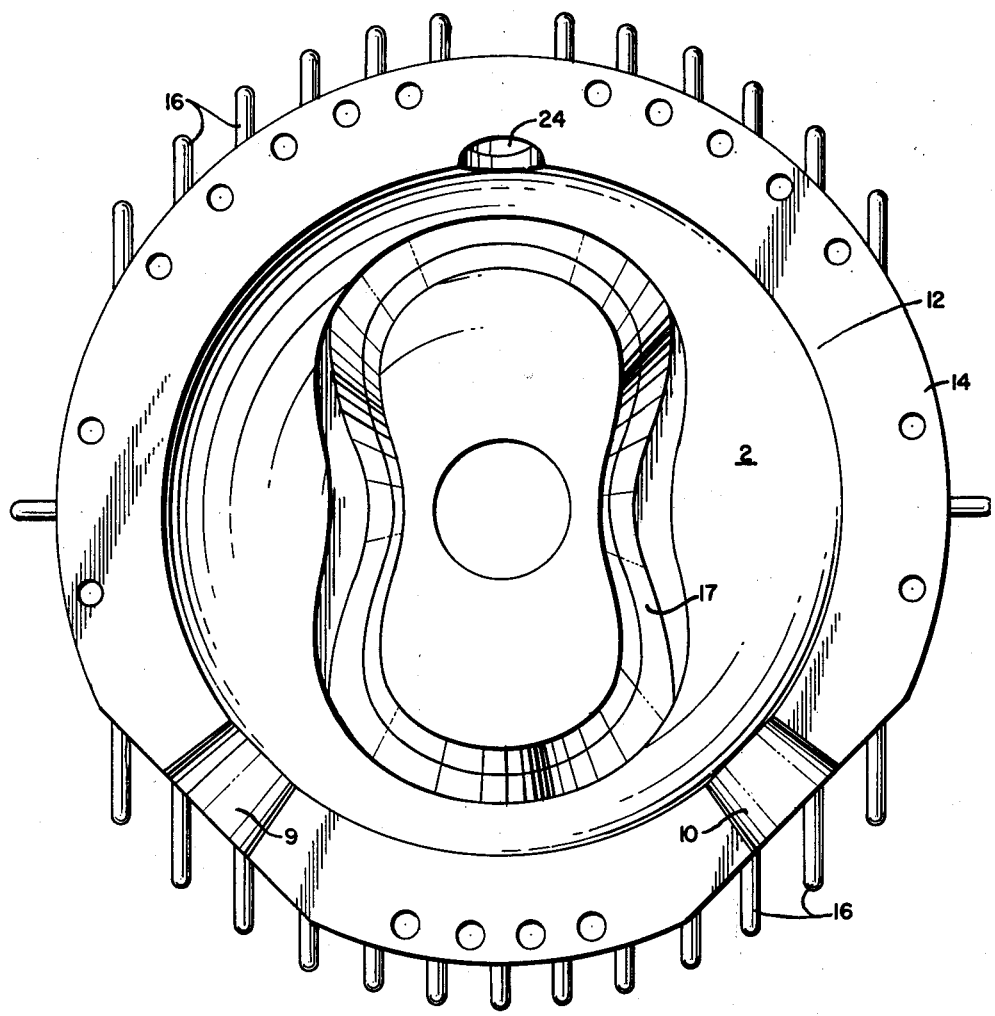
FIG. 4 is a view similar to FIG. 3 with the piston elements and other moving parts removed to reveal the interior of one-half of the spherical piston chamber.

The cam means 8 consists essentially of the cam groove 17, the general form of which is best revealed in FIG. 4, and cooperating cam rollers 18 mounted for free rotation upon cylindrical bearings 19 of piston arms 20, suitable means being provided for positioning rollers 18 and locking them to the respective piston arms. Cam track 17 preferably is provided with hardened inserts 21 seated in recesses in the radially extending walls of the groove for good wear resistance and for replacement of worn parts. Hardened inserts 21 are held in place by cover plates 22 secured by machine screws or other fastenings 23 with suitable gasketing between the cover plates and casing. The casing is provided with intake and exhaust ports 9 and 10 respectively. It will be understood that these will be connected to the conventional intake and exhaust passages or manifolds. A spark plug chamber 24 is provided with means for mounting a conventional spark plug 25 (FIG. 2), the size of the spark plug chamber and of the chamber 26 between the adjacent faces of the pistons A, B in the positions occupied at the end of the compression stroke being designed to the desired compression ratio. Ignition, carburation, cooling, lubrication and manifolding can be employed according to the designer's preference as will be understood by those versed in the design and construction of internal combustion engines. Also it is possible to introduce piston seals between the spherical faces 27 of the pistons and the spherical interior 2 of the casing. However, it will be observed that a good surface sealing area is available so that in some cases it wil be permissible to omit the use of mechanical seals as, for example, when the device is used as a compressor, air motor, hydraulic pump or hydraulic motor. Lubrication of the engine can be accomplished through the arms 28 and adjoining walls of the piston cage 4.

The piston cage 4 consists essentially of two truncated spherical segments joined by the aforesaid arms 28. One or both of the arms may be apertured to receive shaft studs 29 threaded for attachment to the cage by means of the nut 15.

Figure 3:
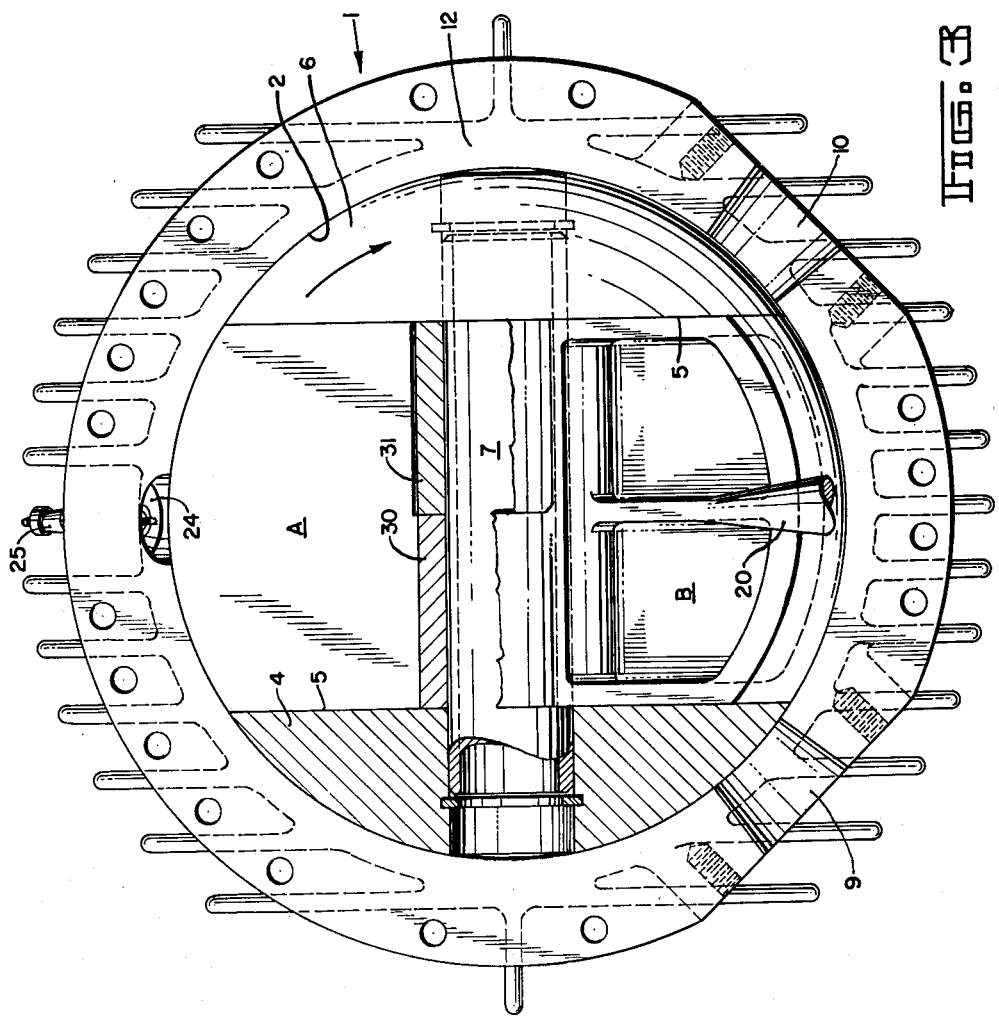
FIG. 3 is a transverse sectional view taken on the line 3—3 of FIG. 2.

My preferred construction of the piston assemblies for the internal combustion engine is shown in FIGS. 2, 3 and 15, pistons A and A' being formed as one member, B and B' as another, and the two being constructed and arranged to fit together in a freely interlocking relationship through the provision of cylindrical bearing portions 30, 31 each extending for just one-half of the width of the pistons so that they come together at the center to complete a pair of scissors. This results in a scissoring piston construction permitting oscillation of the respective pairs of pistons A, B and A', B' toward and away from one another. It will be observed that the piston arms 20 and rollers 18 for pistons A' and B' might be omitted since the movement of these pistons will in any case be produced by movement of pistons A and B. However, I consider it desirable from the standpoint of maximum reliability, strength, wear and balance, to employ cam means in association with both pairs of pistons. Also it would in some cases be feasible to omit one of the pairs of pistons such as the pistons A' and B' as in the case of a motor or pump. Again it would be possible to omit also one of the pistons A or B, replacing it by a non-moving abutment fixed to the cage. However, by using all four pistons in the arrangement shown, a particularly desirable arrangement is secured from the standpoint of balance and displacement capacity with minimum arc of piston oscillation.

*Operation of the Engine*

The cycle of the internal combustion engine will now be explained with reference to FIGS. 5 to 14 inclusive.

In FIGS. 5 and 6 we see the engine at the instant of firing. The pistons are in the closed position with a compressed charge between pistons A and B, and a fully exhausted chamber between the pistons A' and B'. Both the intake and exhaust ports 9 and 10 are closed at this moment, i.e. pistons A' and B' are exactly between the ports.

In FIGS. 7 and 8 the rotating parts have turned through 90°. The expansion of the burning charge has spread the pistons A and B by pressure, at the same time spreading A' and B', creating a vacuum. By the action of the cams this expansion has produced rotation. In turning 90°, the pistons A' and B' have passed the intake port. Because they are expanding during this time, the vacuum draws in a charge of fuel. At the point of maximum expansion, the intake port 9 is passed and closed off exactly at the 90° position.

FIGS. 9 and 10 show the rotating parts in the 180° position. In turning to this position the pistons A and B, by inertia, compress and, since they begin to open the exhaust port just past 90°, the AB chamber exhausts during the 90 to 180° rotation and closes the exhaust at 180°. At the same time the A'B' chamber is being compressed in preparation for firing at the spark plug position.

In FIGS. 11 and 12 we see that rotation has advanced to the 270° point. At the 180° point the spark plug has fired, setting off the charge at A'B' and the expansion has sent pistons A'B' around a quarter rotation. In the meantime pistons AB have separated, passed and closed the intake port 9, taking in a fresh charge.

At this point a new cycle begins. In the complete rotation A and B were driven apart; then they were brought together while passing the exhaust port 10, then opened again while passing the intake port 9; and finally, after closing the intake port again, compressing the charge for the next cycle. In the same rotation pistons A' and B' will have separated while passing the intake port, thus ingesting a charge, then this charge was compressed, fired and the pistons driven to full expansion, and finally, passing the exhaust port, brought together again.

From the foregoing description of the operation, it will be discerned that the preferred form of engine affords one power stroke per revolution per pair of pistons, or two power strokes per revolution. The specific design here represented is approximately equivalent to a four cycle engine of conventional construction. This is very much like having two engines in one and is made possible by the fact that in effect we have two pairs of pistons traversing the same piston chamber, plus the fact that the chamber is spherical in form and encloses maximum volume for a given size and weight of engine.

Compressors and Other Rotary Power Units

In applying the invention to air motors, compressors, hydraulic pumps and motors, the construction of the casing and piston cage may remain substantially as described except that the cam groove 17 will be altered in accordance with FIG. 17 to provide the cycle of operation shown in FIG. 16. Also in these applications I have designed the modified piston construction illustrated in FIG. 18 wherein the scissoring construction of the pistons of FIG. 15 is replaced by four independently hinged pistons. Here the cylindrical attaching portions 32 of the several pistons are offset relatively one to another so that when they are all brought together on the same axis a—b, they will collectively extend across the full width of the pistons. The advantage in having four independent pistons for use in these types of rotary power units is that it becomes possible to have the pistons A, B coming together at the same time the pistons A' and B' are coming together, thus to bring into coincidence both the intake and discharge strokes of the two pairs of pistons. With this arrangement there will be two power strokes per revolution as before.

Modified Forms of Pistons

FIGS. 19 to 24 inclusive illustrate different forms of piston faces in a series of operational views to explain the firing action of the several forms.

FIG. 19 shows flat faced pistons at the instant of firing, and FIG. 20 shows the same pistons in the positions occupied at the end of expansion. In FIGS. 21 and 22 the adjacent faces of the pistons are modified to provide pockets 33 and 34. These pockets may be entirely separate from one another when the pistons are at fully compressed position as in FIG. 21. The effect of this arrangement will be understood by consideration of FIG. 22 in which the crosses represent burning gases and the circles represent gases not yet fully ignited, combustion having taken place initially only in the pocket 33 and ignition of the gases in pocket 34 delayed until the pistons have somewhat separated from one another.

A similar delayed ignition of part of the combustible mixture may be secured by the alternate arrangement explained in FIGS. 23 and 24, where the separation into two pockets 35 and 36 is secured by means of an arcuate projection 37 on the right-hand piston extending into a similarly shaped recess 38 in the other piston. FIG. 24 illustrates an action similar to that described with reference to FIG. 22 in which the crosses again represent ignited or burning gases and the circles represent gases not yet fully ignited. As the arcuate projection 37 of the right-hand piston begins to pass the point of complete withdrawal from the recess 38 of the other piston, the burning gases from the initial ignition will separately ignite the charge contained in the lower pocket 36.

The effect of the modifications illustrated in FIGS. 21 through 24 is to smooth out and lengthen the period of burning of the ignited mixture.

It will be understood that one or more units of the construction I have described may be joined together in either series or parallel arrangement as may be desired.

Another advantage of my spherical trajectory scissoring piston arrangement is that the spaces behind the pistons will reduce the differential pressure between the power chamber and the backs of the pistons. This will help to prevent leakage between the spherical faces of the pistons and casing, and to the extent that compression occurs behind the pistons, the energy used in such compression is not lost since the back pressure thus created will help to restore the original positions of the pistons in which they are again brought together. If this restorative and pressure-compensating action is not desired in any particular application of the invention, a further possibility is presented, namely to provide porting in the casing at the backs of the pistons, such ports affording access for cooling air. With such an arrangement the pumping action of the backs of the pistons will draw in and discharge cooling air two times for each revolution of the shaft.

When my construction is used for a hydraulic pump or motor, using a non-compressible liquid, it is desirable that the intake and exhaust (suction and discharge) be designed with zero overlap. However, in the case of compressors and air motors, it is desirable that the overlap be such that the discharge pressure will equal the pressure in the power chamber at the point where the overlap begins.

The terms and expressions which I have employed are used in a descriptive and not a limiting sense, and I have no intention of excluding equivalents of the invention described and claimed.

I claim:

1. A rotary power device comprising a casing with a spherical interior, a drive shaft extending through the wall of the casing, a piston cage within the casing and fixed to the drive shaft, the piston cage having outer portions rotatable in proximity to the spherical interior of the casing and being recessed to receive piston means, the piston means including at least one piston member pivotally mounted in the cage for oscillation about an axis substantially normal to a plane containing the axis of rotation of the cage, the spherical interior of the casing combining with portions of the cage and piston means to form a power chamber, cam means for predetermining successive positions of the piston relative to the casing during a cycle of rotation of the cage in which the piston oscillates to alternately enlarge and contract the volume of the power chamber, and a fluid inlet and outlet constructed and arranged to admit fluid as the power chamber enlarges and to discharge fluid as the power chamber contracts.

2. A rotary power device comprising a casing with a spherical interior, a drive shaft extending through the wall of the casing, a piston cage within the casing and fixed to the drive shaft, the piston cage having outer portions rotatable in proximity to the spherical interior of the casing and being recessed to receive piston means, the piston means including a pair of piston members pivotally mounted in the cage for oscillation about an axis substantially normal to a plane containing the axis of rotation of the cage, the spherical interior of the casing combining with portions of the cage and pistons to form a power chamber, cam means for predetermining successive positions of the pistons relative to the casing during a cycle of rotation of the cage in which the pistons oscillate toward and away from one another to alternately enlarge and contract the volume of the power chamber, and a fluid inlet and outlet constructed and arranged to admit fluid as the power chamber enlarges and to discharge fluid as the power chamber contracts.

3. A rotary power device comprising a casing with a spherical interior, a drive shaft extending through the wall of the casing, a piston cage within the casing and fixed to the drive shaft, the piston cage having outer portions rotatable in proximity to the spherical interior of the casing and being recessed to receive piston means, the piston means including two pairs of piston members pivotally mounted in the cage for oscillation about an axis substantially normal to a plane containing the axis of rotation of the cage, the spherical interior of the casing combining with portions of the cage and portions of each pair of pistons to form a power chamber, cam means for predetermining successive positions of the pistons relative to the casing during a cycle of rotation of the cage in which the pistons of each pair oscillate toward and away from one another to alternately enlarge and contract the volume of the power chamber, and a fluid inlet and outlet constructed and arranged to admit fluid as the respective power chambers enlarge and to discharge fluid as the respective power chambers contract.

4. A rotary internal combustion engine comprising a casing with a spherical interior, a drive shaft extending through the wall of the casing, a piston cage within the casing and fixed to the drive shaft, the piston cage having outer portions rotatable in proximity to the spherical interior of the casing and being recessed to receive piston means, the piston means including at least one piston member pivotally mounted in the cage for oscillation about an axis substantially normal to a plane containing the axis of rotation of the cage, the spherical interior of the casing combining with portions of the cage and piston means to form a compression and combustion chamber, cam means for predetermining successive positions of the piston relative to the casing during a cycle of rotation of the cage in which the piston oscillates to alternately enlarge and contract the volume of the compression-combustion chamber for expansion of the burning fuel mixture, exhaust, intake of fresh fuel mixture and compression, the expanding gases driving the piston and thereby applying power to rotate the cage through engagement of the cam means of the piston and casing, and a fluid inlet and outlet constructed and arranged to admit the fresh fuel mixture and exhaust the burned gases in time with the engine operating cycle.

5. A rotary internal combustion engine comprising a casing with a spherical interior, a drive shaft extending through the wall of the casing, a piston cage within the casing and fixed to the drive shaft, the piston cage having outer portions rotatable in proximity to the spherical interior of the casing and being recessed to receive piston means, the piston means including a pair of piston members pivotally mounted in the cage for oscillation about an axis substantially normal to a plane containing the axis of rotation of the cage, the spherical interior of the casing combining with portions of the cage and pistons to form a compression and combustion chamber, cam means for predetermining successive positions of the pistons relative to the casing during a cycle of rotation of the cage in which the pistons oscillate toward and away from one another to alternately enlarge and contract the volume of the compression-combustion chamber for expansion of the burning fuel mixture, exhaust, intake of fresh fuel mixture and compression, the expanding gases driving the pistons and thereby applying power to rotate the cage through engagement of the cam means of the pistons and casing, and a fluid inlet and outlet constructed and arranged to admit the fresh fuel mixture and exhaust the burned gases in time with the engine operating cycle.

6. A rotary internal combustion engine comprising a casing with a spherical interior, a drive shaft extending through the wall of the casing, a piston cage within the casing and fixed to the drive shaft, the piston cage having outer portions rotatable in proximity to the spherical interior of the casing and being recessed to receive piston means, the piston means including two pairs of piston members pivotally mounted in the cage for oscillation about an axis substantially normal to a plane containing the axis of rotation of the cage, the spherical interior of the casing combining with portions of the cage and portions of each pair of pistons to form a compression and combustion chamber, cam means for predetermining successive positions of the pistons relative to the casing during a cycle of rotation of the cage in which the pistons of each pair oscillate toward and away from one another to alternately enlarge and contract the volume of the compression-combustion chamber for expansion of the burning fuel mixture, exhaust, intake of fresh fuel mixture and compression, the expanding gases driving the pistons and thereby applying power to rotate the cage through engagement of the cam means of the pistons and casing, and a fluid inlet and outlet constructed and arranged to admit the fresh fuel mixture and exhaust the burned gases in time with the engine operating cycle.

No references cited.